United States Patent
Hamanaka et al.

(10) Patent No.: US 10,040,320 B2
(45) Date of Patent: Aug. 7, 2018

(54) HEAVY DUTY PNEUMATIC TIRE

(71) Applicant: The Yokohama Rubber Co., LTD., Minato-ku, Tokyo (JP)

(72) Inventors: Hideki Hamanaka, Hiratsuka (JP); Shoei Kakuta, Hiratsuka (JP); Yukihito Yamaguchi, Hiratsuka (JP); Risa Tauchi, Hiratsuka (JP); Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/328,468

(22) PCT Filed: Jul. 23, 2015

(86) PCT No.: PCT/JP2015/070930
§ 371 (c)(1),
(2) Date: Jan. 23, 2017

(87) PCT Pub. No.: WO2016/013600
PCT Pub. Date: Jan. 28, 2016

(65) Prior Publication Data
US 2017/0217256 A1     Aug. 3, 2017

(30) Foreign Application Priority Data

Jul. 23, 2014   (JP) .................................. 2014-149818
May 13, 2015   (WO) .................. PCT/JP2015/063719

(51) Int. Cl.
*B60C 11/13*      (2006.01)
*B60C 11/11*      (2006.01)
(Continued)

(52) U.S. Cl.
CPC ............... *B60C 11/13* (2013.01); *B60C 11/11* (2013.01); *B60C 11/0316* (2013.01);
(Continued)

(58) Field of Classification Search
CPC .......... B60C 2200/06; B60C 2200/065; B60C 11/0316; B60C 11/13; B60C 2011/0365; B60C 2011/0367; B60C 2009/1871
See application file for complete search history.

(56) References Cited

U.S. PATENT DOCUMENTS 3,717,191 A * 2/1973 Harrington et al. ...... B60C 9/20
152/380
5,637,163 A * 6/1997 Kobayashi ................ B60C 9/20
152/526
(Continued)

FOREIGN PATENT DOCUMENTS

JP         02189202     *   7/1990  ............... B60C 9/20
JP     H02-189202         7/1990
(Continued)

OTHER PUBLICATIONS

Machine translation of JP02-189202 (no date).*
International Search Report for International Application No. PCT/JP2015/070930 dated Aug. 25, 2015, 4 pages, Japan.

*Primary Examiner* — Steven D Maki
*Assistant Examiner* — Philip N Schwartz
(74) *Attorney, Agent, or Firm* — Thorpe North & Western

(57) ABSTRACT

The present technology provides a heavy duty pneumatic tire with a tread portion having a tread pattern including: a pair of circumferential primary grooves defined in a wave-like shape and extending in the tire circumferential direction; center lug grooves; center blocks; and circumferential secondary grooves extending in regions of the center blocks and open to the center lug grooves. The center lug grooves have two groove turning portions turned in a bend shape or a curved shape. The circumferential secondary grooves extend in an inclined manner relative to the tire circumferential direction. An inclination angle ($\theta_4$) of the circumferential secondary grooves relative to the tire circumferential (Continued)

direction is different from an inclination angle ($\theta_1$) of portions of the circumferential primary grooves relative to the tire circumferential direction, the portions extending toward the same side as a side in the tire width direction, toward which the circumferential secondary grooves are inclined.

17 Claims, 7 Drawing Sheets

(51) Int. Cl.
*B60C 11/03* (2006.01)
*B60C 9/18* (2006.01)

(52) U.S. Cl.
CPC ............... *B60C 2009/1871* (2013.01); *B60C 2011/0353* (2013.01); *B60C 2011/0365* (2013.01); *B60C 2011/0367* (2013.01); *B60C 2200/065* (2013.01)

(56) References Cited

U.S. PATENT DOCUMENTS

| | | | |
|---|---|---|---|
| D457,128 S * | 5/2002 | Robert | D12/579 |
| 2007/0199633 A1 | 8/2007 | Hayashi | |
| 2008/0078488 A1 | 4/2008 | Yoda | |
| 2008/0105347 A1 * | 5/2008 | Matsunaga | B60C 3/04 152/209.14 |

FOREIGN PATENT DOCUMENTS

| | | |
|---|---|---|
| JP | H09-136514 | 5/1997 |
| JP | 2004-098914 | 4/2004 |
| JP | 2004-224131 | 8/2004 |
| JP | 2006-151083 | 6/2006 |
| JP | 2007-191093 | 8/2007 |
| JP | 2008-279976 | 11/2008 |
| JP | 2010-125999 | 6/2010 |
| WO | WO 2006/001202 | 1/2006 |
| WO | WO 2006/057169 | 6/2006 |

* cited by examiner

HEAVY DUTY PNEUMATIC TIRE

TECHNICAL FIELD

The present technology relates to a heavy duty pneumatic tire provided with a tread pattern.

BACKGROUND ART

High chipping resistance is required for heavy duty tires mounted on large vehicles such as dump trucks, since chipping easily occurs on a tread surface during off-road running, such as running at a mine. Meanwhile, with the heavy duty tire having a plurality of blocks formed on the tread surface thereof, heat easily builds up as a result of the blocks repeatedly deforming when running. Particularly when the tire is used on off-roads, the heat build-up in the blocks tends to cause separation, called heat separation, between a belt layer inside a tread portion and a tread rubber. Thus, high heat resistance is required for the heavy duty tire.

Examples of conventional heavy duty tires having a plurality of blocks formed on the tread surface thereof include a tire disclosed in Japanese Unexamined Patent Application Publication No. H09-136514A. The heavy duty tire disclosed in Japanese Unexamined Patent Application Publication No. H09-136514A is a pneumatic tire having a tread provided with at least one circumferential groove extending in the circumferential direction, a plurality of lateral grooves connected to the circumferential groove and disposed on both sides of a circumferential groove at intervals in the circumferential direction. In this pneumatic tire, (1) the circumferential groove extends in the circumferential direction within a tread central region that corresponds to 50% of the tread width, (2) the groove depth of the circumferential groove is 5% or greater of the tread width, and (3) of the lateral grooves, at least those provided on both sides of the tread have a groove depth that is 109% or greater of that of the circumferential groove.

According to this type of heavy duty tire, both traction performance on bad roads and wet performance at high speed are achieved in a compatible manner.

However, the tire disclosed in Japanese Unexamined Patent Application Publication No. H09-136514A does not have sufficient chipping resistance and heat resistance.

SUMMARY

The present technology provides a heavy duty pneumatic tire capable of achieving both chipping resistance and heat resistance in a compatible manner.

An aspect of the present technology is a heavy duty pneumatic tire that is provided with a tread pattern and that includes a tread portion having a tread pattern. The tread pattern includes a plurality of center lug grooves provided at intervals in a tire circumferential direction that cross a tire equator line, the plurality of center lug grooves each including tow ends disposed in half-tread regions on a first side and a second side of a tire equator line in a tire width direction and extending in the half-tread regions, and a plurality of shoulder lug grooves provided at intervals in the tire circumferential direction in each of the half-tread regions, extending toward an outer side in the tire width direction, and each including an end of each on the outer side in the tire width direction opened to a ground contact edge on either side of both sides in the tire width direction. A position of an end of each of the plurality of shoulder lug grooves on an inner side in the tire width direction is further to an outer side in the tire width direction than a position of each of the two ends of each of the plurality of center lug grooves in the tire width direction, and the plurality of shoulder lug grooves are each provided one by one between adjacent center lug grooves in the tire circumferential direction of the plurality of center lug grooves. The adjacent center lug grooves are adjacent to each other in the tire circumferential direction. The tread pattern further includes a pair of circumferential primary grooves provided in each of the half-tread regions and defined in a wave-like shape in the tire circumferential direction. The pair of circumferential primary grooves each includes a first groove turning portion disposed therein in a bent shape or a curved shape toward an outer side in the tire width direction, and a second groove turning portion disposed therein in a bent shape or a curved shape toward the inner side in the tire width direction such that the pair of circumferential primary grooves each alternatingly connect the ends of the plurality of center lug grooves and the end of the plurality of shoulder lug grooves on the inner side in the tire width direction. The pair of circumferential primary grooves has a groove width less than a groove width of the plurality of shoulder lug grooves. The tread pattern further includes a plurality of center blocks each defined by the plurality of center lug grooves and the pair of circumferential primary grooves and formed in a row in the tire circumferential direction; and a circumferential secondary groove extending in a region of each of the plurality of center blocks and opened to the center lug grooves in contact with one of the plurality of center blocks.

The plurality of center lug grooves each include two groove turning portions where each center lug groove turns in a bent shape or a curved shape. The circumferential secondary groove extends in an inclined manner relative to the tire circumferential direction and connects between a third groove turning portion among the groove turning portions of one of the plurality of center lug grooves in contact with one of the plurality of center blocks and a fourth groove turning portion among the groove turning portions of another of the plurality of center lug grooves in contact with the one of the plurality of center blocks. The circumferential primary grooves and the circumferential secondary groove are inclined relative to the tire circumferential direction, the circumferential primary grooves each include a section inclined toward a side in the tire width direction identical with the circumferential secondary groove. An inclination angle $\theta_1$ of the section relative to the tire circumferential direction is different from an inclination angle $\theta_4$ of the circumferential secondary groove relative to the tire circumferential direction.

It is preferable that, on the first side, the third groove turning portion of each of the plurality of center lug grooves be bent or curved protruding out toward a third side in the tire circumferential direction, and that, on the second side, the fourth groove turning portion of each of the plurality of center lug grooves be bent or curved protruding out toward a fourth side opposite the third side in the tire circumferential direction.

It is preferable that a first connection end of each of the plurality of center lug grooves on the first side and a second connection end of each of the plurality of center lug grooves on the second side, with which each of the plurality of center lug grooves is connected to the pair of circumferential primary grooves, be each connected to an end of the second groove turning portion on the inner side in the tire width direction, and that the second connection end of the plurality of center lug grooves be located further to the third side in the tire circumferential direction than the first connection end. Further, regarding a center position of each of the plurality of center lug grooves in a groove width direction, it is preferable that an inclination angle relative to the tire width direction of a first straight line that connects the first connection end and a protruding end of the third groove turning portion protruding out toward the third side in the tire circumferential direction, and an inclination angle relative to the tire width direction of a second straight line that connects the second connection end and a protruding end of the fourth groove turning portion protruding out toward the fourth side in the tire circumferential direction be larger than an inclination angle of a third straight line that connects the first connection end and the second connection end of each of the plurality of center lug grooves.

Regarding the center position of each of the plurality of center lug grooves in the groove width direction, it is preferable that a portion of each of the plurality of center lug grooves between the protruding end of the third groove turning portion protruding out toward the third side in the tire circumferential direction and the first connection end be on the first straight line or on the third side with respect to the first straight line, and that a portion of each of the plurality of center lug grooves between the protruding end of the fourth groove turning portion protruding out toward the fourth side in the tire circumferential direction and the second connection end be on the second straight line or on the fourth side with respect to the second straight line.

For the inclination angle $\theta_4$ and the inclination angle $\theta_1$, it is preferable that $|\theta_1 - \theta_4|$ be from 10 to 25 degrees.

It is preferable that each of the pair of circumferential primary grooves be provided with a raised bottom portion at which the groove becomes partially shallower.

For a shallowest groove depth $D_2$ on the raised bottom portion and a tread width T of the tread portion in the tire width direction, it is preferable that a ratio $D_2/T$ be less than 0.05.

It is preferable that the tread portion include a tread rubber including a tread surface on which the tread pattern is formed, and that, for a thickness $G_1$ of the tread rubber on the tire equator line and a thickness $G_2$ of the tread rubber at a position at which a groove depth of the circumferential primary groove is deepest, a ratio $G_1/G_2$ be from 4.0 to 7.0.

It is preferable that the tread rubber include a cap rubber that forms a tread surface, and that a durometer hardness, compliant with JIS K6253, of the cap rubber be from 60 to 75.

For a groove width $P_4$ of the circumferential secondary groove and a groove width $P_1$ of each of the pair of circumferential primary grooves, it is preferable that a ratio $P_4/P_1$ be from 0.85 to 1.15.

For a deepest groove depth $D_4$ of the circumferential secondary groove and a deepest groove depth $D_3$ of each of the plurality of center lug grooves, it is preferable that a ratio $D_4/D_3$ be from 0.20 to 0.80.

It is preferable that the heavy duty pneumatic tire further include: a belt portion including a pair of first cross belt layers, belt cords of which being inclined with respect to each other relative to the tire circumferential direction, and a pair of second cross belt layers provided on an outer side in a tire radial direction of the first cross belt layers, belt cords of which being inclined with respect to each other relative to the tire circumferential direction.

It is preferable that the belt portion further include a sheet-like rubber disposed between belt layers of the pair of second cross belt layers, and that, for a maximum width $W_4$ of the sheet-like rubber in the tire width direction and a maximum width $W_B$ of the plurality of center blocks, a ratio $W_4/W_B$ be from 0.7 to 1.00.

For a belt width $W_5$ of an outermost belt layer of the belt portion and the maximum width $W_B$ of each of the plurality of center blocks, it is preferable that a ratio $W_B/W_5$ be from 0.50 to 0.90.

It is preferable that each of the plurality of center blocks has a corner formed in correspondence with the first groove turning portion of each of the pair of circumferential primary grooves having a wave-like shape, the first groove turning portion protruding outward in the tire width direction; and the corner has obtuse angles.

It is preferable that a groove width of each of the pair of circumferential primary grooves and a groove width of the plurality of center lug grooves be from 7 to 20 mm.

The above-described heavy duty pneumatic tire is suitable for being mounted on a construction vehicle or an industrial vehicle.

According to the tire of the present technology, both chipping resistance and heat resistance can be achieved in a compatible manner.

DETAILED DESCRIPTION

The following is a detailed description of a heavy duty pneumatic tire according to the present technology.

Figure 1:
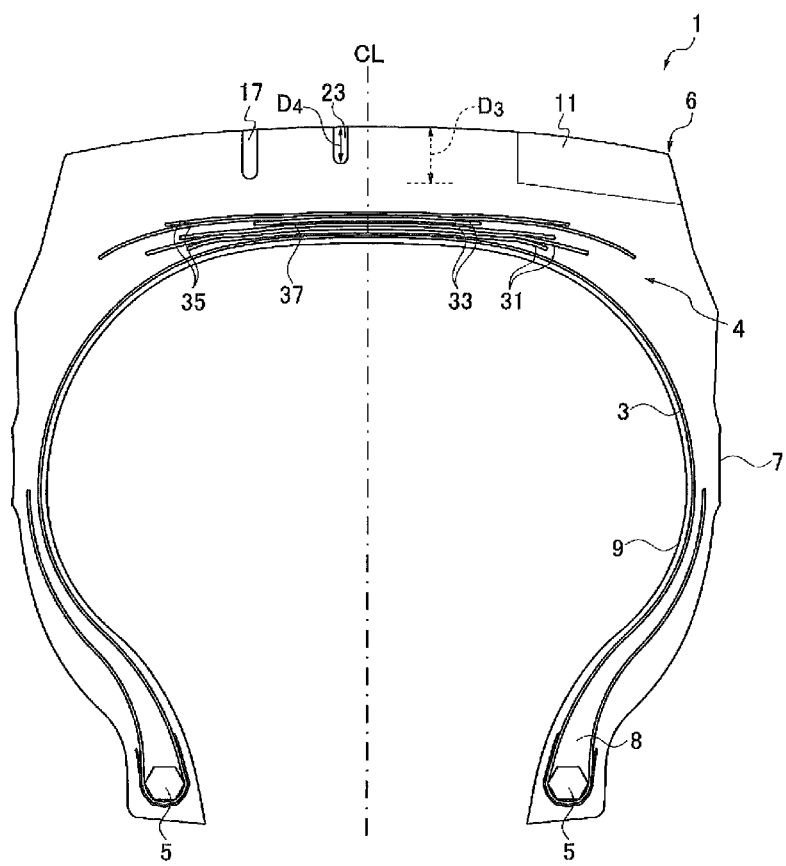
FIG. 1 is a cross-sectional view of a portion of a tire of an embodiment of the present technology.

FIG. 1 illustrates a profile of a heavy duty pneumatic tire (hereinafter also referred to as "tire") 1 of the present embodiment when the tire 1 is cut along a plane including a tire rotational axis of the tire 1, and passing through the line X-X' in FIG. 2, which will be described later.

Besides the tires described in Section C of the Japan Automobile Tyre Manufacturers Association (JATMA) Year Book 2014, heavy duty pneumatic tires in the present specification refer to Type 1 tires (dump trucks, and scrapers), Type 2 tires (graders), Type 3 tires (shovel loaders, etc.), Type 4 tires (tire rollers), and tires for mobile cranes (truck cranes, and wheel cranes), which are all described in Section D of the JATMA YEAR BOOK 2014, or to tires for vehicles described in Section 4 and Section 6 of the Tire and Rim Association, Inc. (TRA) 2013 Year Book.

The tire 1 mainly includes, as skeletal materials, a carcass ply 3, a belt portion 4, and a pair of bead cores 5, and, around these skeletal materials, includes each of rubber layers, namely, a tread portion 6, a side portion 7, a bead filler 8, an inner liner 9 and the like.

Figure 2:
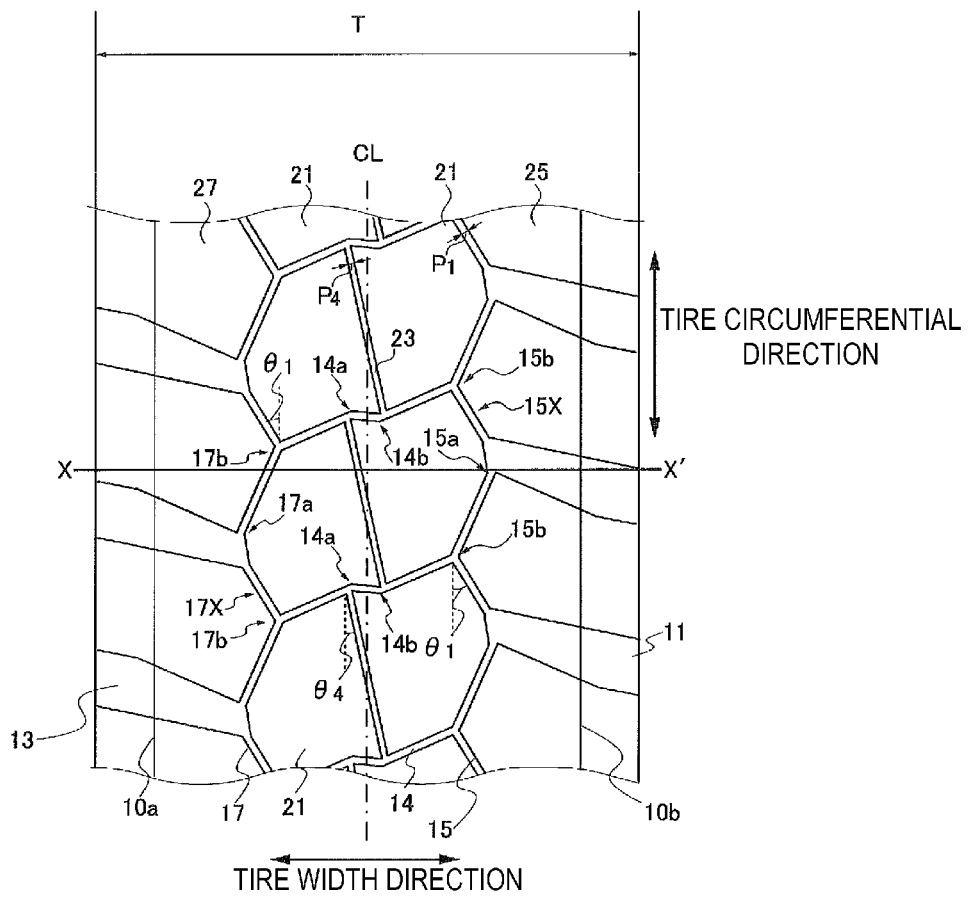
FIG. 2 is a developed plan view of a tread pattern of the tire.

The tread portion 6 is provided with a tread pattern illustrated in FIG. 2. FIG. 2 is a developed plan view of a tread pattern of the tire 1. Note that in FIG. 2, the vertical direction is a tire circumferential direction, and the lateral direction is a tire width direction. Here, "the tire circumferential direction" refers to a direction in which a rotating surface of a tread surface rotates, the rotating surface being obtained when the tire 1 rotates around the tire rotational center axis. "The tire width direction" refers to a direction of the tire rotational center axis. The tire rotation direction of the tread pattern, and the orientation of the tire width direction when the tire is mounted on a vehicle are not particularly specified.

The tread pattern includes shoulder lug grooves 11, 13, a pair of circumferential primary grooves 15, 17, center lug grooves 14, and center blocks 21.

A plurality of the shoulder lug grooves 11, 13 are provided at intervals in the tire circumferential direction, in each of half-tread regions on both sides of a tire equator line CL in the tire width direction (a first side and a second side). In each of the half-tread regions, the shoulder lug grooves 11, 13 extend outward in the tire width direction, and open to the closer ground contact edge of ground contact edges 10a and 10b on both the sides in the tire width direction.

The ground contact edges 10a and 10b are defined as described below. The ground contact edges 10a, 10b are edge portions in the tire width direction of a ground contact surface, when the tire 1 is brought into contact with a horizontal surface under conditions in which the tire 1 is fitted to a standard rim and inflated to a standard inner pressure, and an applied load is set to 88% of a standard load. Herein, a "standard rim" refers to a "measurement rim" as defined by JATMA, a "design rim" as defined by TRA, or a "measuring rim" as defined by the European Tyre and Rim Technical Organisation (ETRTO). Further, "standard inner pressure" refers to a "maximum air pressure" as defined by JATMA, the maximum value in "TIRE LOAD LIMITS AT VARIOUS COLD INFLATION PRESSURES" as defined by TRA, or an "INFLATION PRESSURE" as defined by ETRTO. "Standard load" refers to a "maximum load capacity" as defined by JATMA, the maximum value in "TIRE LOAD LIMITS AT VARIOUS COLD INFLATION PRESSURES" as defined by TRA, or a "LOAD CAPACITY" as defined by ETRTO.

Of the shoulder lug grooves 11, 13 located on both sides in the tire width direction, a position in the tire circumferential direction of one of the shoulder lug grooves 11 or one of the shoulder lug grooves 13 in one of the half-tread regions is between positions in the tire circumferential direction of another two of the shoulder lug grooves 13 or another two of the shoulder lug grooves 11 that are adjacent to each other in the other half-tread region.

Further, in each of the half-tread regions, a position in the tire width direction of an inner side end of each of the shoulder lug grooves 11, 13 in the tire width direction is located further outward in the tire width direction than end positions of the center lug grooves 14 (described later) in the tire width direction. At the same time, in the tire circumferential direction, the shoulder lug grooves 11, 13 are provided one by one in each of shoulder regions located between the adjacent center lug grooves 14 that are adjacent to each other in the tire circumferential direction of the center lug grooves 14. As a result, in each of the half-tread regions, the circumferential primary grooves 15, 17, which will be described later, form a wave-like shape by alternatingly connecting the ends of the center lug grooves 14 and the inner side ends in the tire width direction of the shoulder lug grooves 11, 13.

Note that, although the groove width of the shoulder lug grooves 11, 13 changes in a direction in which the grooves extend in FIG. 2, the groove width needs not necessarily change.

The pair of circumferential primary grooves 15, 17 are provided in the half-tread regions on both sides of the tire equator line CL in the tire width direction. In the half-tread regions, first groove turning portions 15a, 17a, which are bent or curved outward in the tire width direction, and second groove turning portions 15b, 17b, which are bent or curved inward in the tire width direction, are each disposed in the circumferential primary grooves 15, 17 with the ends of the center lug grooves 14 (described later) and the inner side ends in the tire width direction of the shoulder lug grooves 11, 13 alternatingly connecting to the circumferential primary grooves 15, 17. As a result, each of the circumferential primary grooves 15, 17 forms a wave-like shape over the whole circumference in the tire circumferential direction. The groove width of the circumferential primary grooves 15, 17 is less than the groove width of the shoulder lug grooves 11, 13. When it is said that the groove forms the wave-like shape it means that the groove forms a meandering shape. Specifically, the circumferential primary grooves 15, 17 each include the plurality of first groove turning portions 15a, 17a, which are turned protruding outward in the tire width direction, and the plurality of second groove turning portions 15b, 17b, which are turned protruding inward in the tire width direction, and extend in the tire circumferential direction while meandering so as to form a wave-like shape. As a result of each of the circumferential primary grooves 15, 17 being defined in the wave-like shape, a surface area of groove walls thereof is increased, and heat dissipation is thus improved. As a result, heat resistance is improved.

The groove turning portions may be a bent shape, may be a round curved shape, or may be a combination of the bent and curved shapes. The curved shape also includes a shape obtained by rounding a peak portion of a bent shape at a specified curvature radius, for example. The combination of the bent and curved shapes refers to a shape of a groove turning portion whose peak portion extends in a linear manner on one side and extends in a curved manner on the other side. The groove turning portions included in each of the circumferential primary grooves 15, 17 and the center lug grooves 14 may be defined all in the same shape or in different shapes from each other, from among various types of shapes, namely, the bent shape, the curved shape, and the combination of the bent and curved shapes.

Further, portions of the circumferential primary grooves 15, 17 and the center lug grooves 14 excluding the groove turning portions may form a linear shape or a curved shape. When both the groove turning portions and the portions excluding the groove turning portions each form a curved shape, two of the curved shapes may be curved shapes having the same curvature radius.

The circumferential primary grooves 15, 17 are each connected to the shoulder lug grooves 11, 13 at the first groove turning portions 15a, 17a protruding outward in the tire width direction. Further, the circumferential primary grooves 15, 17 are each connected to the center lug grooves 14 at the second groove turning portions 15b, 17b protruding inward in the tire width direction. Positions of the second groove turning portions 15b in the tire circumferential direction are offset from the second groove turning portions 17b provided in the half-tread region on the opposite side. In FIG. 2, the circumferential primary grooves 15, 17 extend in the wave-like shapes that have the same period and have a mutually shifted phase. Note that forms of the circumferential primary grooves 15, 17 are not limited to this example. The circumferential primary grooves 15, 17 may extend in wave-like shapes that have the same period and a mutually matching phase, or may extend in wave-like shapes that have a mutually different period.

Each of the circumferential primary grooves 15, 17 is a narrow groove, with a groove width that is less than that of the shoulder lug grooves 11, 13.

Therefore, a ground contact pressure of the center blocks 21 is relaxed during running, and a wear life of the tire 1 is thus extended.

The center lug grooves 14 are provided in a plurality at intervals in the tire circumferential direction. The center lug grooves 14 cross the tire equator line CL and extend in the half-tread regions of both sides of the tire equator line CL in the tire width direction to two ends. Each of the center lug grooves 14 is a groove that connects the second groove turning portion 15b of the circumferential primary groove 15 and the second groove turning portion 17b of the circumferential primary groove 17, which form both the ends of the center lug groove 14. Because the circumferential primary grooves 15, 17 extend in the wave-like shapes having the mutually different phases, the center lug grooves 14 each extend inclining with respect to the tire width direction.

The center blocks 21 are defined by the center lug grooves 14 and the circumferential primary grooves 15, 17, and are defined in a plurality in a row in the tire circumferential direction. A tire center line (tire equator line) CL passes through the center blocks 21.

The tread pattern further includes shoulder blocks 25, 27. The shoulder blocks 25, 27 are defined by the shoulder lug grooves 11, 13 and the circumferential primary grooves 15, 17, and are defined in a plurality in a row in the tire circumferential direction.

In addition to a basic form described above, the tread pattern of the present embodiment is characterized in that the center lug grooves 14 each have a third groove turning portion 14a and a fourth groove turning portion 14b as two groove turning portions, and further, the tread pattern includes circumferential secondary grooves 23 having a form described later.

The third groove turning portions 14a and the fourth groove turning portions 14b of the center lug grooves 14 are turning portions obtained as a result of the grooves changing direction in the tread surface, and they protrude in the opposite direction from each other in the tire circumferential direction. By the center lug groove 14 having a plurality of the groove turning portions 14a, 14b, a surface area of groove walls of the center lug grooves 14 is increased. As a result, the heat dissipation is improved, thereby improving the heat resistance. Further, by having the groove turning portions 14a and 14b, the center lug grooves 14 are displaced into the wave-like shape in the tire circumferential direction. When the number of groove turning portions is only zero or one, heat dissipation is not sufficient. The number of groove turning portions of the center lug groove 14 may be three or more, and may be three or four, for example.

Although the groove turning portions 14a and 14b are formed in the bent shape in FIG. 2, the shape thereof may be a curved shape or a combination of the bent and curved shapes. The curved shape also includes a shape obtained by rounding a peak portion of a bent shape at a specified curvature radius, for example. The combination of the bent and curved shapes refers to a shape of the groove turning portion whose peak portion extends in a linear manner on one side and extends in a curved manner on the other side. The groove turning portions included in the center lug grooves 14 may be formed all in the same shape or in different shapes from each other, from among various types of shapes, namely, the bent shape, the curved shape, and the combination of the bent and curved shapes.

Further, portions of the center lug grooves 14 excluding the groove turning portions may each form a linear shape or a curved shape. When both the groove turning portions and the portions excluding the groove turning portions each form a curved shape, two of the curved shapes may be curved shapes having the same curvature radius.

The groove turning portions 14a and 14b are preferably provided on both sides of the tire center line CL in the tire width direction, at positions separated from the tire center line CL by the same distance. Each of the center lug grooves 14 is preferably provided such that, of the center lug groove 14, the tire center line CL passes through a portion between the groove turning portion 14a and the groove turning portion 14b.

More specifically, each of the center lug grooves 14 preferably has a form described below.

Figure 3:
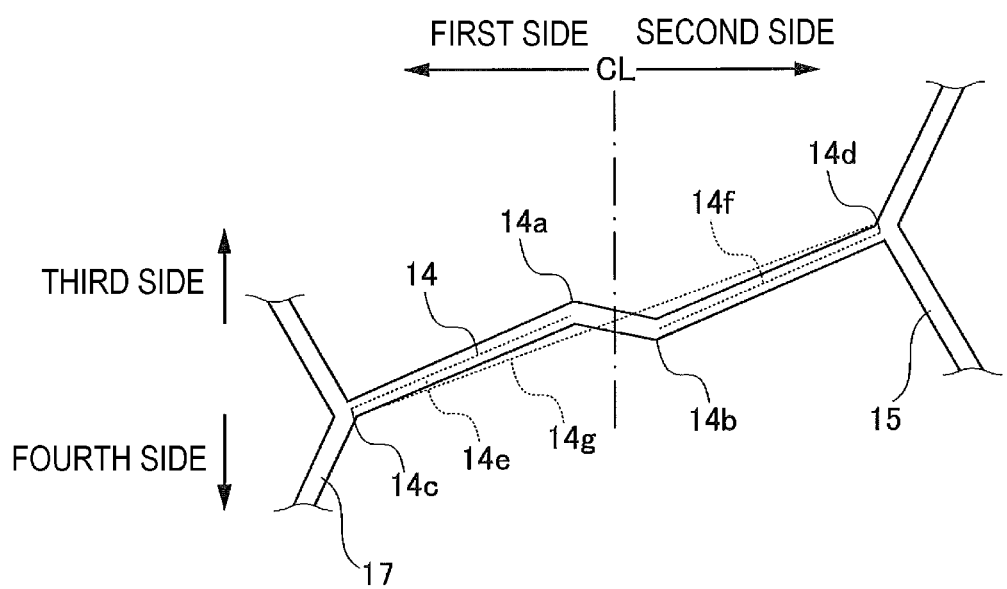
FIG. 3 is an enlarged view of a center lug groove.

FIG. 3 is a diagram illustrating the shape of the center lug groove 14 illustrated in FIG. 2 in a specific manner. Note that, for convenience of explanation, an illustration of the circumferential secondary groove 23 is omitted in FIG. 3. As illustrated in FIG. 3, the third groove turning portion 14a of the center lug groove 14 is preferably bent or curved protruding out toward a third side (an upward direction side in FIG. 3) in the tire circumferential direction, on a first side (a left side in FIG. 3) of the tire equator line CL.

The third groove turning portion 14b of the center lug groove 14 is preferably bent or curved protruding out toward a fourth side (a downward direction side in FIG. 3), which is the opposite side to the third side in the tire circumferential direction, on a second side (a right side in FIG. 3) of the tire equator line CL. Here, a first connection end 14c on the first side that connects the center lug groove 14 to the circumferential primary groove 17 and a second connection end 14d on the second side that connects the center lug groove 14 to the circumferential primary grooves 15 are ends of the circumferential primary grooves 15, 17 on the inner side in the tire width direction, namely, are the second groove turning portions 15b, 17b. Then, the second connection end 14d of the center lug groove 14 is located further to the third side (the upward direction side in FIG. 3) in the tire circumferential direction than the first connection end 14c.

At this time, in relation to a center position in the groove width direction of the center lug groove 14, an inclination angle (an inclination angle larger than 0 degrees and smaller than 90 degrees), relative to the tire width direction, of a first straight line 14e that connects a protruding end of the third groove turning portion 14a protruding out toward the third side (the upward direction side in FIG. 3) in the tire circumferential direction with the first connection end 14c, and an inclination angle (an inclination angle greater than 0 degrees and less than 90 degrees), relative to the tire width direction, of a second straight line 14f that connects a protruding end of the fourth groove turning portion 14b protruding out toward the fourth side in the tire circumferential direction with the second connection end 14d, are preferably larger than an inclination angle (an inclination angle greater than 0 degrees and less than 90 degrees), relative to the tire width direction, of a third straight line 14g that connects the first connection end 14c and the second connection end 14d of the center lug groove 14.

As illustrated in FIGS. 2 and 3, in a preferred form of the present embodiment, in relation to the center position in the groove width direction of the center lug groove 14, a portion of the center lug groove 14 between the protruding end of the third groove turning portion 14a protruding out toward the third side in the tire circumferential direction and the first connection end 14c is located on the first straight line 14e or on the third side of the first straight line 14e, and a portion of the center lug groove 14 between the protruding end of the fourth groove turning portion 14b protruding out toward the fourth side in the tire circumferential direction and the second connection end 14d is located on the second straight line 14f or on the fourth side of the second straight line 14f.

As a result of the center blocks 21 being formed in this manner, the tread rigidity of the center blocks 21 can be increased. Specifically, because the center blocks 21 are each formed in an anisotropic shape that is defined by the center lug grooves 14 that are inclined in one direction relative to the tire width direction, when the center blocks 21 are separated from the road surface and kicked back from the tire contact surface, due to the anisotropic shape, the center blocks 21 deform while twisting in a clockwise direction or an anti-clockwise direction. At this time, because the groove width of the circumferential primary grooves 15, 17 is narrow, the center blocks 21 function integrally with the shoulder blocks 25, 27, which are adjacent to each other in the tire width direction while sandwiching the circumferential primary grooves 15, 17 therebetween, by meshing with the shoulder blocks at the first and second groove turning portions 15a, 17a, 15b, 17b. As a result, the tread rigidity of the center blocks 21 can be increased. As a result of increasing the tread rigidity of the center blocks 21, the twisting of the center blocks 21 can be suppressed, and local wear in regions of the center blocks 21 can be suppressed on both sides of the center lug grooves 14 in the tire circumferential direction.

Further, as a result of providing the third and fourth groove turning portions 14a, 14b, the tread rigidity of the center blocks 21 can be further increased. Specifically, when the center blocks 21 are separated and kicked back from the road surface, the center blocks 21 deform and start to collapse due to a shearing force in the tire circumferential direction acting on the center blocks 21 received from the road surface. At this time, the center blocks 21 adjacent to each other in the circumferential direction function integrally by meshing with each other at the third and fourth groove turning portions 14a, 14b of the center lug groove 14, and generate a counter force. Thus, the tread rigidity of the center blocks 21 can be increased. As a result of increasing the tread rigidity of the center blocks 21, the collapsing of the center blocks 21 can be suppressed, and local wear in regions of the center blocks 21 can be suppressed on both sides of the center lug grooves 14 in the tire circumferential direction.

Further, since the twisting of the center blocks 21 can be suppressed as described above, deformation of the center blocks 21 is suppressed, and heat build-up of the center blocks 21 is suppressed. As a result, the heat resistance is improved. Further, in addition to the fact that each of the center lug grooves 14 has the third and fourth groove turning portions 14a, 14b, because the groove length of the center lug groove 14 is made longer as a result of the center lug groove 14 being inclined relative to the tire width direction, the surface area of the groove walls thereof is increased, and the heat dissipation is improved. The heat resistance is improved in this respect also.

Further, as described above, as a result of the center blocks 21 and the shoulder blocks 25, 27 integrally functioning by meshing with each other and of the center blocks 21 integrally functioning by engaging with each other, the number of corner portions of the blocks, which become origin points for chipping, is reduced. As a result, chipping resistance is improved. Note that angles formed by the third and fourth groove turning portions 14a, 14b are preferably obtuse angles, as illustrated in FIGS. 2 and 3. The angles formed by the third and fourth groove turning portions 14a, 14b refer to angles on a side toward which the circumferential secondary grooves 23 extend (below the third groove turning portions 14a and above the fourth groove turning portions 14b in FIG. 2). Bending angles of the third and fourth groove turning portion 14a, 14b are from 100 to 140 degrees, for example. Note that when a peak portion of the center block 21 is formed in a curved shape, the curved shape can be formed with a large curvature radius.

The circumferential secondary grooves 23 extend over regions of the center blocks 21 and are open to the center lug grooves 14 that are in contact with the center blocks 21. In other words, the circumferential secondary grooves 23 extend over the regions of the center blocks 21 connecting two of the center lug grooves 14 adjacent to each other in the tire circumferential direction. Specifically, each of the circumferential secondary grooves 23 extends while being inclined relative to the tire circumferential direction, and connects the third groove turning portion 14a, of the groove turning portions of the center lug groove 14, that is on one side in the tire circumferential direction, with the fourth groove turning portion 14b, of the groove turning portions of the center lug groove 14, that is on the other side in the tire circumferential direction. As a result of the circumferential secondary grooves 23 being open to the groove turning portions 14a, 14b of the center lug grooves 14, the heat dissipation is improved, and the heat resistance is thus improved. For example, the circumferential secondary groove 23 is preferably connected to the center lug groove 14 at end positions of the groove turning portions 14a, 14b of the center lug grooves 14 (specifically, positions (protruding tips) protruding furthest, in the tire circumferential direction, from the third straight line 14g connecting both the ends of the center lug groove 14). Note that the circumferential secondary groove 23 is defined in each of the plurality of center blocks 21, and two of the circumferential secondary grooves 23 adjacent to each other in the tire circumferential direction are communicated with each other via the center lug groove 14.

An inclination angle $\theta_4$ of the circumferential secondary groove 23 relative to the tire circumferential direction is different from an inclination angle $\theta_1$ of sections 15X, 17X of the circumferential primary grooves 15, 17 relative to the tire circumferential direction, the sections 15X, 17X extending toward the same side as a side in the tire width direction toward which the circumferential secondary groove 23 is inclined. In other words, with respect to the inclinations at which the circumferential primary grooves 15, 17 and the circumferential secondary grooves 23 are inclined relative to the tire circumferential direction, the circumferential primary grooves 15, 17 have the sections 15X, 17X that are inclined toward the same side in the tire width direction as the circumferential secondary grooves 23, and the inclination angle $\theta_1$ of the sections 15X, 17X relative to the tire circumferential direction is different from the inclination angle $\theta_4$ of the circumferential secondary grooves 23 relative to the tire width direction. The above-described sections 15X, 17X of the circumferential primary grooves 15, 17 are portions extending from the first groove turning portions 15a, 17a to the second groove turning portions 15b, 17b in FIG. 2. The above-described sections 15X, 17X are inclined toward the same side as the side (the left side in FIG. 2) in the tire width direction toward which the circumferential secondary grooves 23 are inclined relative to the tire width direction, and the inclination angle $\theta_1$ thereof is different from the inclination angle $\theta_4$ of the circumferential secondary grooves 23. In other words, the direction in which the above-described sections 15X, 17X extend is not in parallel with the direction in which the circumferential secondary grooves 23 extend. As a result of the circumferential secondary grooves 23 and the above-described sections 15X, 17X having the mutually different inclination angles, a tire width direction length (a ground contact length in the tire width direction) of the center block 21, which is divided into two by the circumferential secondary groove 23, gradually changes in the tire circumferential direction. Therefore, the ground contact pressure changes during running and is dispersed in the tire circumferential direction. As a result, chipping does not easily occur when running on bad roads, and the chipping resistance is thus improved. Note that although the inclination angle $\theta_1$ is greater than the inclination angle $\theta_4$ in FIG. 2, the inclination angle $\theta_1$ may be less than the inclination angle $\theta_4$. Further, although the magnitude of the inclination angle $\theta_1$ is the same for the circumferential primary grooves 15, 17 in FIG. 2, the magnitude thereof may be different for the circumferential primary grooves 15, 17.

From the perspective of the chipping resistance, the groove depth of the circumferential secondary grooves 23 is preferably shallower than that of the circumferential primary grooves 15, 17. However, from the perspective of the heat resistance, the groove depth of the circumferential secondary grooves 23 may be the same as or deeper than that of the circumferential primary grooves 15, 17. Note that when the groove depth of the circumferential primary grooves 15, 17 is not constant, the groove depth of the circumferential primary grooves 15, 17 described above means a maximum depth thereof.

In terms of having a small number of locations that become origin points for chipping, the circumferential secondary grooves 23 preferably extend in a linear manner, as illustrated in FIG. 2. However, the circumferential secondary grooves 23 may have a groove turning portion that is turned in a bent shape or a curved shape. The groove turning portion is a section that is turned as a result of the groove changing direction on the tread surface. The groove turning portion may be formed in the same manner as the groove turning portions of the center lug grooves 14. Specifically, the groove turning portion may be formed in a bent shape, a round curved shape, or a combination of the bent and curved shapes. The curved shape also includes a shape obtained by rounding a peak portion of a bent shape at a specified curvature radius, for example. The combination of the bent and curved shapes refers to a shape of the groove turning portion whose peak portion extends in a linear manner on one side and extends in a curved manner on the other side. The groove turning portions included in the circumferential secondary grooves 23 may be defined all in the same shape or in different shapes from each other, from among various types of shapes, namely, the bent shape, the curved shape, and the combination of the bent and curved shapes.

Further, portions of the circumferential secondary grooves 23 excluding the groove turning portions may form a linear shape or a curved shape. When both the groove turning portions and the portions excluding the groove turning portions each form a curved shape, two of the curved shapes may be curved shapes having the same curvature radius.

Although the circumferential secondary grooves 23 intersect the tire center line CL in FIG. 2, the circumferential secondary groove 23 need not necessarily intersect the tire center line CL, and may be defined on one side of the tire center line CL in the tire width direction.

In the tire 1 of the present embodiment, with respect to the inclination angle $\theta_4$ of the circumferential secondary grooves 23 and the inclination angle $\theta_1$ of the circumferential primary grooves 15, 17, it is preferable that $|\theta_1-\theta_4|$ be from 10 to 25 degrees. As a result, the ground contact pressure changes, and effects of improving the chipping resistance are enhanced. $|\theta_1-\theta_4|$ is more preferably from 15 to 20 degrees and is 18 degrees, for example.

Figure 4:
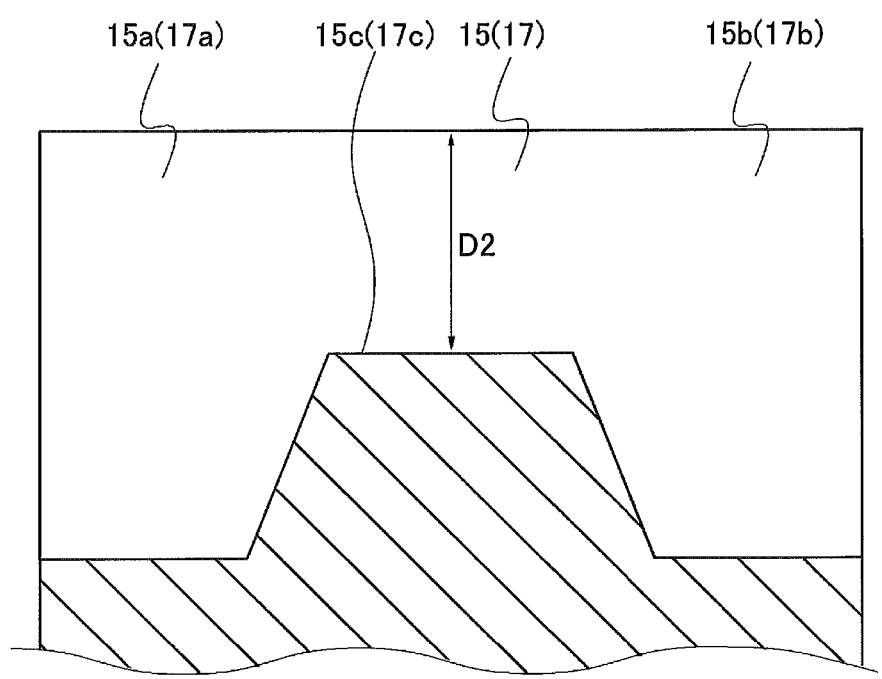
FIG. 4 is a cross-sectional view of a raised bottom portion of a circumferential primary groove.

As illustrated in FIG. 4, it is preferable that the tire 1 of the present embodiment be each provided with raised bottom portions 15c, 17c in the circumferential primary grooves 15, 17, where the grooves become partially shallower. FIG. 4 is a cross-sectional view cut along a direction in which the grooves extend, illustrating the raised bottom portion 15c or 17c. In FIG. 4, reference signs of portions relating to the circumferential primary groove 15 are indicated outside parentheses, and reference signs of portions relating to the circumferential primary groove 17 are indicated inside parentheses. Of the circumferential primary groove 15, 17, the raised bottom portion 15c, 17c are each formed in linear portions that form the wave-like shape.

The bottoms of the raised bottom portions 15c, 17c are raised in central regions in a direction in which the circumferential primary grooves 15, 17 extend. As a result, the center blocks 21 and the shoulder blocks 25 support each other, thereby suppressing the collapsing of the blocks, and thus the rigidity of the center blocks 21 is improved. As a result, the chipping resistance is improved. Meanwhile, because the groove depth of the circumferential primary grooves 15, 17 is deep in the sections (the second groove turning portions) 15a, 15b, 17a, and 17b connected to the shoulder lug grooves 11, 13, good heat dissipation and excellent heat resistance are obtained. The raised bottom portions 15c, 17c may have a constant groove depth as illustrated in the drawing, or may have different groove depths. When the raised bottom portions 15c, 17c have different groove depths, there are cases in which they have two or more different groove depths with steps therebetween or in which the groove depth gradually changes, for example. The raised bottom portions 15c, 17c are not particularly limited, but are each formed in a region having a length corresponding to from 30 to 70% of a length between the first groove turning portions 15a, 17a and the second groove turning portions 15b, 17b. Further, the raised bottom portion may be formed differently from the form illustrated in FIG. 4, namely, it need not necessarily be formed in the central region in the direction in which the groove extends, but may be formed on one side or both sides of end regions of the groove.

Further, with respect to a shallowest groove depth $D_2$ on the raised bottom portions 15c, 17c and a tread width T of the tread portion 6 in the tire width direction, a ratio $D_2/T$ is preferably less than 0.05. The groove depth $D_2$ is a length from the tread surface to the raised bottom portion 15c or 17c in FIG. 4. The tread width T is a length between the ground contact edges 10a, 10b in the tire width direction. As a result of the ratio $D_2/T$ being less than 0.05, the center blocks 21 and the shoulder blocks 25 support each other, and the effects of improving the chipping resistance are thereby improved. The ratio $D_2/T$ is more preferably 0.04 or less, and is 0.03, for example. A lower limit value of the ratio $D_2/T$ is not particularly limited, but is 0.01, for example.

Figure 5:
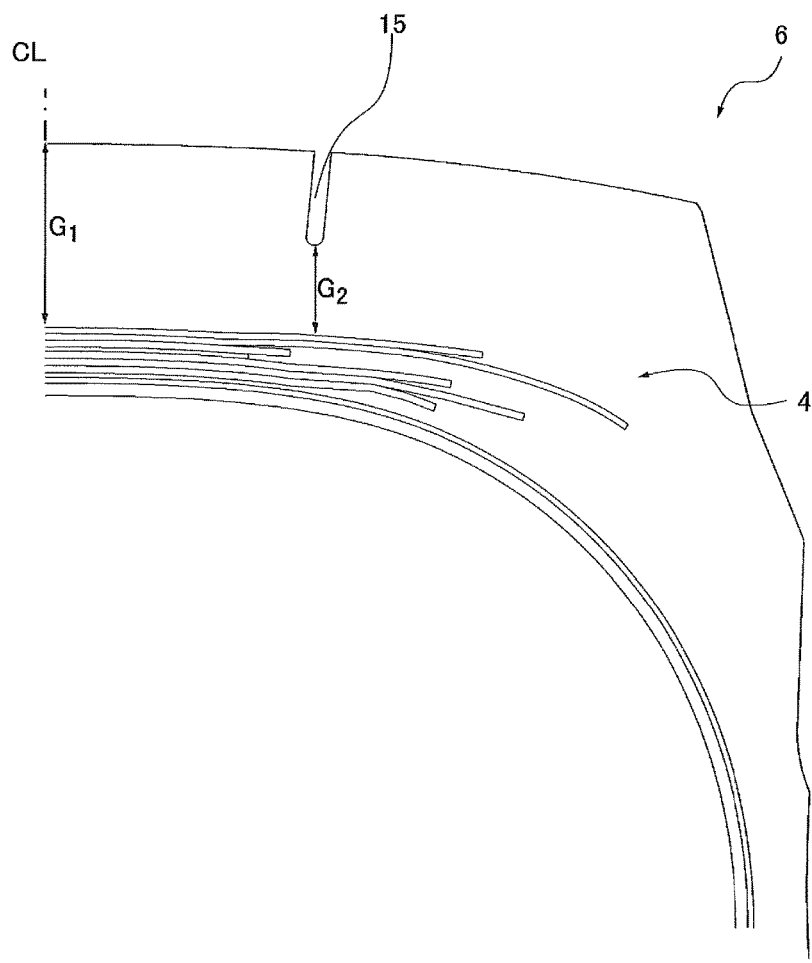
FIG. 5 is a diagram illustrating a thickness $G_1$ and a thickness $G_2$ by enlarging a part of FIG. 2.

In the tire 1 of the present embodiment, it is preferable that the tread portion 6 include a tread rubber having the tread pattern formed on the tread surface thereof, and with respect to a thickness $G_1$ of the tread rubber at the tire center line CL and a thickness $G_2$ of the tread rubber in a section in which the groove depth of the circumferential primary grooves 15, 17 is maximum, both of which are illustrated in FIG. 5, it is preferable that a ratio $G_1/G_2$ be from 4.0 to 7.0. FIG. 5 is a diagram illustrating the thickness $G_1$ and the thickness $G_2$ by enlarging a part of FIG. 2. The tread rubber is a rubber disposed on the outer side of the belt portion 4 in the tire radial direction. In other words, the thickness $G_1$ is a distance between the tread surface and the belt portion 4, and the thickness $G_2$ is a shortest distance between the circumferential primary grooves 15, 17 and the belt portion 4. Note that when the circumferential secondary groove 23 intersect the tire center line CL, the thickness $G_1$ is a thickness of portions excluding the intersecting positions. As a result of the ratio $G_1/G_2$ being in the range described above, both the chipping resistance and the heat resistance can be enhanced in a compatible manner. Such range of the ratio $G_1/G_2$ is preferable when the tire 1 is used as an off-road tire. In this specification, the off-road tire refers to a tire mounted on a construction vehicle or an industrial vehicle, which will be described later. When the ratio $G_1/G_2$ is 4.0 or greater, the ground contact pressure of the center blocks 21 is relaxed, and good chipping resistance is obtained. When the ratio $G_1/G_2$ is 7.0 or less, the heat build-up caused by the collapsing and the deformation of the center blocks 21 is suppressed, and good heat resistance is obtained. The ratio $G_1/G_2$ is more preferably from 5.0 to 6.0, and is 5.5, for example.

Further, in the tire 1 of the present embodiment, it is preferable that the tread rubber include a cap rubber forming the tread surface, and that a durometer hardness compliant with JIS K6253 of the cap rubber be from 60 to 75. In this case, the tread rubber further includes a base rubber disposed on the inner side of the cap rubber in the tire radial direction. The base rubber is a rubber layer disposed between the cap rubber and the belt portion 4. As a result of the durometer hardness of the cap rubber being in the range described above and being relatively soft, the occurrence of chipping is suppressed when running on bad roads. The thickness of the cap rubber is not particularly limited, but is from 80 to 140 mm, for example.

In the tire 1 of the present embodiment, with respect to a groove width $P_4$ of the circumferential secondary grooves 23 and a groove width $P_1$ of the circumferential primary grooves 15, 17, it is preferable that a ratio $P_4/P_1$ be from 0.85 to 1.15. $P_4$ and $P_1$ are illustrated in FIG. 2. As a result of the groove width $P_4$ of the circumferential secondary grooves 23 and the groove width $P_1$ of the circumferential primary grooves 15, 17 being a similar length in this manner, similar heat dissipation can be secured in the circumferential secondary grooves 23 and the circumferential primary grooves 15, 17, and at the same time, the ground contact pressure in the central regions of the center blocks 21 in the tire width direction is relaxed, and thus, the chipping resistance can be improved. Note that both the groove widths $P_4$ and $P_1$ refer to a length on the tread surface in a direction orthogonal to the direction in which each of the grooves extend. The ratio $P_4/P_1$ is more preferably from 0.90 to 1.10, and is 1.0, for example.

In the tire 1 of the present embodiment, with respect to a deepest groove depth $D_4$ of the circumferential secondary grooves 23 and a deepest groove depth $D_3$ of the center lug grooves 14, it is preferable that a ratio $D_4/D_3$ be from 0.20 to 0.80. $D_3$ and $D_4$ are illustrated in FIG. 1. Note that although the center lug groove 14 is not illustrated in FIG. 1, a position of the maximum depth of a groove bottom of the center lug groove 14 is illustrated by a broken line in the horizontal direction. As a result of the ratio $D_4/D_3$ being in this range, both the chipping resistance and the heat resistance can be achieved in a compatible manner. When the ratio $D_4/D_3$ is 0.20 or greater, an area of the groove walls of the circumferential secondary grooves 23 is increased, thereby increasing the heat dissipation, and good heat resistance is thus obtained. When the ratio $D_4/D_3$ is 0.80 or less, the ground contact pressure of the center blocks 21 is relaxed, and good chipping resistance is thus obtained. Note that when the groove depths $D_4$ and $D_3$ are constant in the direction in which the grooves extend, $D_4$ and $D_3$ refer to the groove depths of those grooves, and when the groove depths $D_4$ and $D_3$ vary in the direction in which the grooves extend, $D_4$ and $D_3$ refer to the deepest groove depths of those grooves. The ratio $D_4/D_3$ is more preferably from 0.35 to 0.65, and is 0.50, for example.

Figure 6:
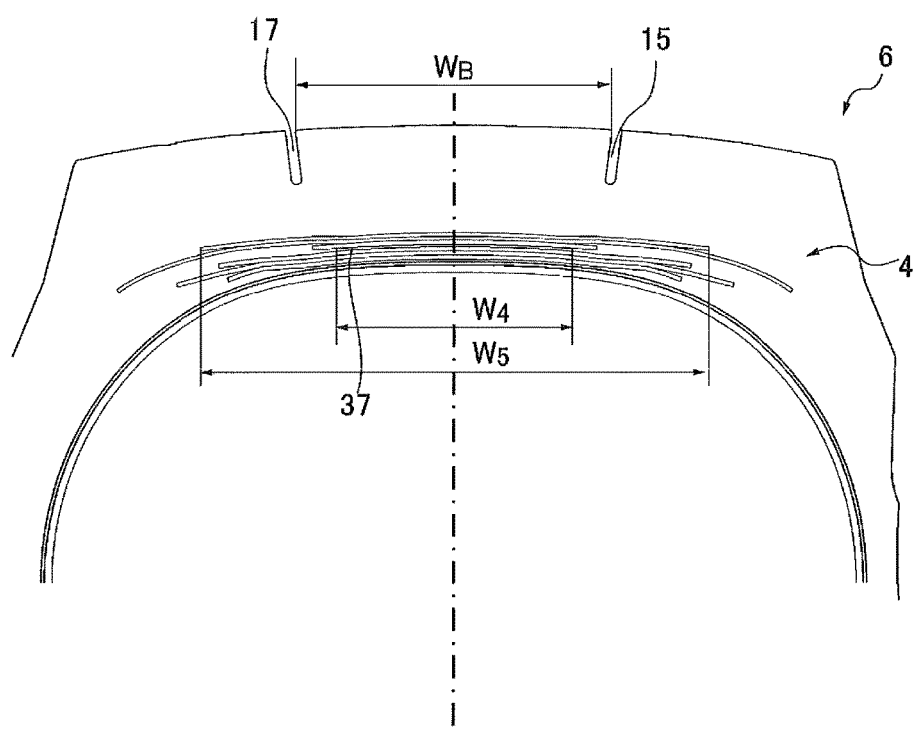
FIG. 6 is a diagram illustrating a width $W_B$, a width $W_4$, and a width $W_5$, using a part of FIG. 2.

In the tire 1 of the present embodiment, as illustrated in FIG. 1, the belt portion 4 further includes a pair of first cross belt layers 31, a pair of second cross belt layers 33, and a sheet-like rubber 37 disposed between belt layers of the second cross belt layers 33. At the same time, with respect to a width $W_4$ of the sheet-like rubber 37 in the tire width direction and a maximum width $W_B$ of the center block 21, both of which are illustrated in FIG. 6, a ratio $W_4/W_B$ is preferably from 0.70 to 1.00. FIG. 6 is a diagram illustrating the width $W_4$, and the width $W_B$ and a width $W_5$, which will be described later, using a part of FIG. 2. In this way, by disposing the sheet-like rubber 37 between the belt layers of the second cross belt layers 33, and relaxing a fastening effect by the second cross belt layers 33, enveloping characteristics are improved, and the chipping resistance is thus improved in the central region in the tire width direction. The ratio $W_4/W_B$ is more preferably from 0.80 to 0.90, and is 0.85, for example. Note that disposing the second cross belt layers on the outer side of the first cross belt layers in the tire radial direction is preferable, when using the tire 1 as an off-road tire.

The maximum width $W_B$ of the center block 21 is a maximum length in a direction parallel with the tire width direction, and is equal to a length when projecting a distance between the first groove turning portions 15a, 17a and the second groove turning portions 15b, 17b in the tire width direction. Note that in FIG. 6, for convenience of explaining the maximum width $W_B$, the center block 21 is illustrated by a cross section of a direction connecting the second groove turning portions 15b, 17b.

As illustrated in FIG. 1, the belt portion 4 preferably further includes third cross belt layers 35 on the outer side of the second cross belt layers 33 in the tire radial direction. The first cross belt layers 31, the second cross belt layers 33, and the third cross belt layers 35 are each a pair of belt layers whose belt cords are inclined in opposite directions relative to the tire circumferential direction, and are disposed in this order from the inner side to the outer side in the tire radial direction.

The thickness of the sheet-like rubber 37 is not particularly limited, but is preferably from 3 to 5 mm, from the perspective of securing the fastening effect by the second cross belt layers 33 while improving the chipping resistance.

Further, in the tire 1 of the present embodiment, with respect to a belt width $W_5$ of an outermost belt layer of the belt portion 4 and the maximum width $W_B$ of the center blocks 21, a ratio $W_B/W_5$ is preferably from 0.50 to 0.90. In FIG. 1, the outermost belt layer of the belt portion 4 is a belt layer located on the outer side in the tire radial direction of belt layers of the third cross belt layers 35. However, when the belt portion 4 does not include the third cross belt layers 35, the outermost belt layer of the belt portion 4 is a belt layer located on the outer side in the tire radial direction of the belt layers of the second cross belt layers 33. By causing the outermost belt layer of the belt portion 4 adjacent to the center blocks 21 to be wider than the center blocks 21, the entire center blocks 21 are reinforced, and the rigidity of the center blocks 21 can be secured. As a result, the chipping resistance and the heat resistance are improved. The ratio $W_B/W_5$ is more preferably from 0.60 to 0.80, and is 0.70, for example.

In the tire 1 of the present embodiment, when the peak portion of the center block 21 formed corresponding to the first groove turning portions 15a, 17a is formed in an angular shape, this corner portion is preferably formed at an obtuse angle, as illustrated in FIG. 2. As a result, stress concentration in the center blocks 21 and the shoulder blocks 25, 27 is suppressed, and the second groove turning portions 15b, 17b are inhibited from becoming the origin points for chipping. As a result, the chipping resistance is improved. Bending angles of the second groove turning portions 15b, 17b are from 100 to 140 degrees, for example. Note that when the peak portion of the center block 21 is formed in a curved shape, the curved shape may be formed with a large curvature radius.

In the tire 1 of the present embodiment, groove widths of the circumferential primary grooves 15, 17 and the center lug grooves 14 are preferably from 7 to 20 mm. As a result, both the chipping resistance and the heat resistance can be achieved in a compatible manner. The groove widths of the circumferential primary grooves 15, 17 and the center lug grooves 14 are 18 mm, for example. Note that setting the groove widths of the circumferential primary grooves 15, 17 and the center lug grooves 14 within the range described above is preferable, when using the tire 1 as an off-road tire.

The above-described heavy duty pneumatic tire 1 is suitable for being mounted on construction vehicles or industrial vehicles. Examples of the construction vehicles and industrial vehicles include such vehicles as dump trucks, scrapers, graders, shovel loaders, tire rollers, wheel cranes, and truck cranes that are described in JATMA, or "Compactor", "Earthmoving", "Grader", "Loader and Dozer" and the like that are specified in TRA.

According to the heavy duty pneumatic tire 1 of the present embodiment, by each of the center lug grooves 14 having the plurality of groove turning portions, the surface area of the groove walls of the center lug grooves 14 is increased, thereby improving the heat dissipation, and the heat resistance is thus improved. Further, as a result of the circumferential secondary grooves 23 being defined connecting the groove turning portion 14a and the groove turning portion 14b of the adjacent center lug grooves 14 with each other, the heat dissipation is improved, and the heat resistance is thus improved. Further, as a result of the inclination angle $\theta_4$ of the circumferential secondary grooves 23 and the inclination angle $\theta_1$ of the above-described sections 15X, 17X of the circumferential primary grooves 15, 17 being different from each other, the ground contact pressure when contacting the ground can be dispersed in the tire circumferential direction, and the chipping resistance is improved. In particular, by setting $|\theta_1-\theta_4|$ to from 10 to 25 degrees, the chipping resistance is further improved.

Although the tread pattern of the present embodiment has been described above using a preferred form in which the third straight line 14g of the center lug groove 14 is inclined relative to the tire width direction, as illustrated in FIGS. 2 and 3, instead of this center lug groove 14, the center lug groove 14 that has the third straight line 14g extending without being inclined relative to the tire width direction can also be used.

WORKING EXAMPLES

In order to investigate the effects of the tire of the present embodiment, various types of test tires with different tread patterns were produced, as shown in Tables 1 to 10 (Working Examples 1 to 41, a Conventional Example, and Comparative Examples 1 to 3), and chipping resistance and heat resistance in a tread center region were examined. Note that apart from the specifications shown in Tables 1 to 10, specifications of the tread pattern in FIG. 2 are used as the specifications of the tires, except for the Conventional Example. Note that Working Example 41 had the same specifications as those of Working Example 1, except that the third straight line 14g of the center lug groove 14 was not inclined in the tire width direction in Working Example 41.

Figure 7:
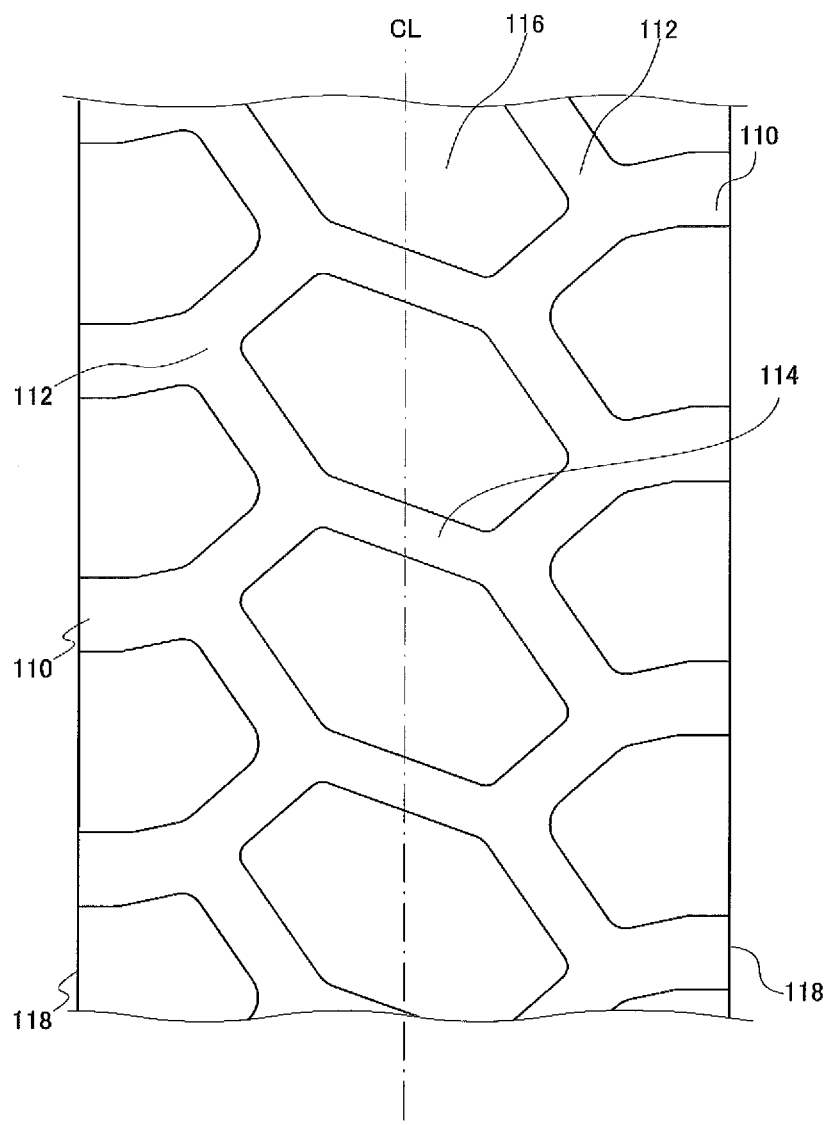
FIG. 7 is a diagram of a tread pattern of a tire of a conventional example.

A tread pattern illustrated in FIG. 7 was used as a tread pattern for the Conventional Example. FIG. 7 is a diagram illustrating the tread pattern of the Conventional Example. The tread pattern illustrated in FIG. 7 includes shoulder lug grooves 110, a pair of circumferential primary grooves 112, center lug grooves 114, and center blocks 116. Although the shoulder lug grooves 110, the pair of circumferential primary grooves 112, the center lug grooves 114, and the center blocks 116 each have the same configurations as the shoulder lug grooves 11, 13, the pair of circumferential primary grooves 15, 17, the center lug grooves 14, and the center blocks 21, the groove width of the shoulder lug grooves 110 and the groove width of the circumferential primary grooves 112 are the same as the groove width of the shoulder lug grooves 11, 13.

Each of the test tires produced was 46/90R57. Each of the tires was mounted on a rim having a rim size of 29.00-6.0 (a TRA specified rim), and chipping resistance tests and heat resistance tests were carried out under the test condition of 700 kPa (a TRA specified air pressure).

Chipping Resistance

The test tires produced were each mounted on an actual vehicle, and traveling tests on an off-road surface were carried out under the test condition in which the applied load was set to 617.82 kN (a TRA specified load). Then, the number and size of chippings generated on the tread surface were visually observed and expressed as index values, with the Conventional Example being 100. The chippings were defined as visually identifiable damaged sections or groove-like scratches generated on the tread surface. Larger index values indicate superior chipping resistance.

Heat Resistance

The test tires produced were each installed on an indoor drum testing machine, and under a condition in which the applied load was set to 110% of a standard maximum load (617.82 kN) compliant with TRA, a travel time up to when the tire failed was measured, while causing the tire to travel at the speed of 5 km/hour and increasing the speed by 1 km/hour every 12 hours. The results were expressed as index values, with the Comparative Example being 100. Larger index values indicate superior heat resistance.

As a result of the above, when both the index values of the chipping resistance and heat resistance were 100 or greater, and a total of the index values was 202 or greater, it was evaluated that both the chipping resistance and the heat resistance were achieved in a compatible manner. Achieving both the chipping resistance and heat resistance in this manner includes not only improving both the chipping resistance and heat resistance in a compatible manner, but also includes improving one of the chipping resistance and heat resistance while maintaining the other of the chipping resistance and heat resistance at the same level as the conventional level. Maintaining the same level as the conventional level means that the level does not deteriorate from the conventional level (the index values expressing the chipping resistance and heat resistance do not fall below those of the Conventional Example).

TABLE 1

|  | Conventional Example | Comparative Example 1 | Comparative Example 2 | Comparative Example 3 |
|---|---|---|---|---|
| Pair of circumferential primary grooves | Presence | Presence | Presence | Presence |
| Shape of circumferential primary groove | Wave-like shape | Wave-like shape | Wave-like shape | Wave-like shape |
| Groove turning portions of center lug grooves | Absence | Presence | Absence | Presence |
| Circumferential secondary grooves | Absence | Absence | Presence | Presence |
| $|\theta_1 - \theta_4|$ | — | — | 0° | 0° |
| Chipping resistance | 100 | 99 | 97 | 95 |
| Heat resistance | 100 | 101 | 103 | 105 |

TABLE 2

|  | Working Example 1 | Working Example 2 | Working Example 3 | Working Example 4 | Working Example 5 | Working Example 6 | Working Example 7 |
|---|---|---|---|---|---|---|---|
| Pair of circumferential primary grooves | Presence | Presence | Presence | Presence | Presence | Presence | Presence |
| Shape of circumferential primary groove | Wave-like shape | Wave-like shape | Wave-like shape | Wave-like shape | Wave-like shape | Wave-like shape | Wave-like shape |
| Groove turning portion of center lug grooves | Presence | Presence | Presence | Presence | Presence | Presence | Presence |
| Circumferential secondary grooves | Presence | Presence | Presence | Presence | Presence | Presence | Presence |
| $|\theta_1 - \theta_4|$ | 5° | 10° | 15° | 18° | 20° | 25° | 30° |
| Chipping resistance | 100 | 100 | 101 | 102 | 101 | 100 | 100 |
| Heat resistance | 103 | 105 | 105 | 105 | 105 | 105 | 103 |

As can been seen from Tables 1 and 2, when the circumferential secondary grooves were not defined in the regions of the center blocks (Comparative Example 1), the heat resistance deteriorated. Further, when the inclination angle $\theta_4$ of the circumferential secondary grooves was the same as the inclination angle $\theta_1$ of the above-described portions of the circumferential primary grooves (Comparative Examples 2 and 3), the chipping resistance deteriorated. In this case, when the center lug grooves did not have the groove turning portions (Comparative Example 2), the heat resistance further deteriorated.

On the other hand, when the inclination angle $\theta_4$ of the circumferential secondary grooves was different from the inclination angle $\theta_1$ of the above-described portions of the circumferential primary grooves (Working Examples 1 to 7), enhancement of both the chipping resistance and heat resistance was achieved in a compatible manner.

Note that in Table 1, with respect to the groove turning portions of the center lug grooves, "Absence" means that each of the center lug grooves is defined in a straight shape.

TABLE 3

|  | Working Example 8 | Working Example 9 | Working Example 10 |
|---|---|---|---|
| Raised bottom portion of circumferential primary grooves | Presence | Presence | Presence |
| $D_2/T$ | 0.06 | 0.05 | 0.03 |
| Chipping resistance | 104 | 105 | 106 |
| Heat resistance | 105 | 105 | 105 |

As can be seen from Table 3, when the above-described $D_2/T$ was less than 0.05 (Working Example 10), the chipping resistance was improved compared with a case in which the above-described $D_2/T$ was 0.05 or greater (Working Examples 8 and 9). Note that in Working Examples 8 to 10, $|\theta_1 - \theta_4|$ was set in the same manner as in Working Example 4.

TABLE 4

|  | Working Example 11 | Working Example 12 | Working Example 13 | Working Example 14 | Working Example 15 |
|---|---|---|---|---|---|
| $G_1/G_2$ | 7.5 | 7.0 | 5.5 | 4.0 | 3.5 |
| $P_4/P_1$ | 0.75 | 0.75 | 0.75 | 0.75 | 0.75 |
| $D_4/D_3$ | 0.10 | 0.10 | 0.10 | 0.10 | 0.10 |
| Chipping resistance | 111 | 110 | 109 | 108 | 106 |
| Heat resistance | 106 | 108 | 109 | 110 | 111 |

As can be seen from Table 4, when the above-described $G_1/G_2$ was from 4.0 to 7.0 (Working Examples 12 to 14), the chipping resistance was improved compared with a case in which the above-described $G_1/G_2$ was less than 4.0 (Working Example 15), and at the same time, the heat resistance was improved compared with a case in which the above-described $G_1/G_2$ was greater than 7.0 (Working Example 11). Note that in Working Examples 11 to 25, the presence/absence of raised bottom portions of the circumferential primary grooves, and the value of $D_2/T$ were set in the same manner as in Working Example 10.

TABLE 5

|  | Working Example 16 | Working Example 17 | Working Example 18 | Working Example 19 | Working Example 20 |
|---|---|---|---|---|---|
| $G_1/G_2$ | 5.5 | 5.5 | 5.5 | 5.5 | 5.5 |
| $P_4/P_1$ | 0.80 | 0.85 | 1.00 | 1.15 | 1.20 |
| $D_4/D_3$ | 0.1 | 0.1 | 0.1 | 0.1 | 0.10 |
| Chipping resistance | 113 | 112 | 111 | 110 | 108 |
| Heat resistance | 107 | 109 | 110 | 111 | 112 |

As can be seen from Table 5, when the ratio $P_4/P_1$ was from 0.85 to 1.15 (Working Examples 17 to 19), the heat resistance was improved compared with a case in which the above-described $P_4/P_1$ was less than 0.85 (Working Example 16), and at the same time, the chipping resistance was improved compared with a case in which the ratio $P_4/P_1$ was greater than 1.15 (Working Example 20).

TABLE 6

|  | Working Example 21 | Working Example 22 | Working Example 23 | Working Example 24 | Working Example 25 |
|---|---|---|---|---|---|
| $G_1/G_2$ | 5.5 | 5.5 | 5.5 | 5.5 | 5.5 |
| $P_4/P_1$ | 1.00 | 1.00 | 1.00 | 1.00 | 1.00 |
| $D_4/D_3$ | 0.10 | 0.20 | 0.50 | 0.80 | 0.90 |
| Chipping resistance | 114 | 113 | 112 | 111 | 109 |
| Heat resistance | 109 | 111 | 112 | 113 | 114 |

As can be seen from Table 6, when the ratio $D_4/D_3$ was from 0.20 to 0.80 (Working Examples 22 to 24), the heat resistance was improved compared with a case in which the ratio $D_4/D_3$ was less than 0.20 (Working Example 21), and at the same time, the chipping resistance was improved compared with a case in which the ratio $D_4/D_3$ was greater than 0.80 (Working Example 25).

TABLE 7

|  | Working Example 26 | Working Example 27 | Working Example 28 | Working Example 29 | Working example 30 |
|---|---|---|---|---|---|
| First cross belt layers | Presence | Presence | Presence | Presence | Presence |
| Second cross belt layers | Presence | Presence | Presence | Presence | Presence |
| Sheet-like rubber between second cross belt layers | Presence | Presence | Presence | Presence | Presence |
| $W_4/W_B$ | 0.65 | 0.70 | 0.85 | 1.00 | 1.10 |
| $W_B/W_S$ | 1.10 | 1.10 | 1.10 | 1.10 | 1.10 |
| Cap rubber hardness @ 20° C. | 57 | 57 | 57 | 57 | 57 |
| Chipping resistance | 113 | 115 | 115 | 115 | 113 |
| Heat resistance | 117 | 118 | 120 | 118 | 117 |

As can be seen from Table 7, when the ratio $W_4/W_B$ was from 0.70 to 1.00 (Working Examples 27 to 29), a balance of the chipping resistance and heat resistance was excellent, compared with a case in which the ratio $W_4/W_B$ was outside the range from 0.70 to 1.00 (Working Examples 26 and 30). Note that when the index values of the chipping resistance and heat resistance were both 100 or greater and when the total value thereof was 232 or greater, it was evaluated that the balance of the chipping resistance and heat resistance was excellent. In Working Examples 26 to 30, the values of $G_1/G_2$, $P_4/P_1$, and $D_4/D_3$ were each set in the same manner as in Working Example 23.

TABLE 8

|  | Working Example 31 | Working Example 32 | Working Example 33 | Working Example 34 | Working Example 35 |
|---|---|---|---|---|---|
| First cross belt layers | Presence | Presence | Presence | Presence | Presence |
| Second cross belt layers | Presence | Presence | Presence | Presence | Presence |
| Sheet-like rubber between second cross belt layers | Presence | Presence | Presence | Presence | Presence |
| $W_4/W_B$ | 0.85 | 0.85 | 0.85 | 0.85 | 0.85 |
| $W_B/W_S$ | 1.00 | 0.90 | 0.70 | 0.50 | 0.40 |
| Cap hardness @ 20° C. | 57 | 57 | 57 | 57 | 57 |
| Chipping resistance | 118 | 117 | 117 | 117 | 115 |
| First cross belt layers | 120 | 122 | 123 | 124 | 125 |

As can be seen from Table 8, when the ratio $W_B/W_5$ was from 0.50 to 0.90 (Working Examples 32 to 34), the heat resistance was improved compared with a case in which the ratio $W_B/W_5$ was greater than 0.90 (Working Example 31), and at the same time, the chipping resistance was improved compared with a case in which the ratio $W_B/W_5$ was less than 0.50 (Working Example 35). Note that in Working Examples 31 to 35, the presence/absence of the first cross belt layers and second cross belt layers, the presence/absence of the sheet-like rubber, and the value of $W_4/W_B$ were each set in the same manner as in Working Example 28.

TABLE 9

|  | Working Example 36 | Working Example 37 | Working Example 38 | Working Example 39 | Working Example 40 |
| --- | --- | --- | --- | --- | --- |
| First cross belt layers | Presence | Presence | Presence | Presence | Presence |
| Second cross belt layers | Presence | Presence | Presence | Presence | Presence |
| Sheet-like rubber between second cross belt layers | Presence | Presence | Presence | Presence | Presence |
| $W_4/W_B$ | 0.85 | 0.85 | 0.85 | .85 | 0.85 |
| $W_B/W_5$ | 0.70 | 0.70 | 0.70 | 0.70 | 0.70 |
| Cap hardness @ 20° C. | 55 | 60 | 67 | 75 | 80 |
| Chipping resistance | 116 | 118 | 119 | 120 | 117 |
| Heat resistance | 123 | 123 | 124 | 125 | 125 |

As can be seen from Table 9, when the durometer hardness of the cap rubber was from 60 to 75 at 20° C. (Working Examples 37 to 39), both the chipping resistance and heat resistance were improved compared with a case in which the durometer hardness was less than 60 (Working Example 36). Note that when the durometer hardness was greater than 75 (Working Example 40), the chipping resistance deteriorated. In Working Examples 36 to 40, the value of $W_B/W_5$ was set in the same manner as in Working Example 33.

TABLE 10

|  | Working Example 41 |
| --- | --- |
| Pair of circumferential primary grooves | Presence |
| Shape of circumferential primary groove | Wave-like shape |
| Groove turning portions of center lug grooves | Presence |
| Circumferential secondary grooves | Presence |
| $|\theta_1 - \theta_4|$ | 5° |
| Chipping resistance | 100 |
| Heat resistance | 102 |

As can be seen from Table 10, even when the third straight line 14g of the center lug groove 14 was not inclined relative to the tire width direction on the tread pattern (Working Example 41), the effects of the present embodiment were obtained. However, by comparing the evaluation result of Working Example 41 and the evaluation result of Working Example 1 in Table 2, it can be seen that the center lug groove 14 is preferably inclined relative to the tire width direction on the tread pattern, from the perspective of improving the heat resistance.

The foregoing has been a detailed description of the heavy duty pneumatic tire of the present technology. However, the present technology is not limited to the above embodiment, and may be improved or modified in various ways within the scope of the present technology.

The invention claimed is:

1. A heavy duty pneumatic tire provided with a tread pattern, the heavy duty pneumatic tire comprising:
   a tread portion having a tread pattern including:
   a plurality of center lug grooves provided at intervals in a tire circumferential direction that cross a tire equator line, the plurality of center lug grooves each including two ends disposed in half-tread regions on a first side and a second side of a tire equator line in a tire width direction, and extending in the half-tread regions;
   a plurality of shoulder lug grooves provided at intervals in the tire circumferential direction in each of the half-tread regions extending toward an outer side in the tire width direction, and each including an end on an outer side in the tire width direction opened to a ground contact edge on either side of both sides in the tire width direction,
   a position of an end of each of the plurality of shoulder lug grooves on an inner side in the tire width direction being further to an outer side in the tire width direction than a position of each of the two ends of each of the plurality of center lug grooves in the tire width direction,
   the plurality of shoulder lug grooves each being provided one by one between adjacent center lug grooves in the tire circumferential direction of the plurality of center lug grooves, the adjacent center lug grooves being adjacent to each other in the tire circumferential direction;
   a pair of circumferential primary grooves provided in each of the half-tread regions and defined in a wave-like shape in the tire circumferential direction, the pair of circumferential primary grooves each including
   a first groove turning portion disposed therein in a bent shape or a curved shape toward an outer side in the tire width direction and
   a second groove turning portion disposed therein in a bent shape or a curved shape toward an inner side in the tire width direction such that the pair of circumferential primary grooves each alternatingly connect the ends of the center lug grooves and the ends of the shoulder lug grooves on the inner side in the tire width direction,
   the pair of circumferential primary grooves having a groove width less than a groove width of the plurality of shoulder lug grooves;
   a plurality of center blocks each defined by the plurality of center lug groove and the pair of circumferential primary grooves and formed in a row in the tire circumferential direction; and a circumferential secondary groove extending in a region of each of the plurality of center blocks and opened to the center lug grooves in contact with one of the plurality of center blocks, the circumferential secondary groove having a groove depth less than a deepest groove depth of the pair of the circumferential primary grooves and a deepest groove depth of the plurality of the center lug grooves;

the plurality of center lug grooves each including two groove turning portions where each center lug groove turns in a bent shape or a curved shape;

the circumferential secondary groove extending in an inclined manner relative to the tire circumferential direction and connecting between a third groove turning portion among the groove turning portions of one of the plurality of center lug grooves in contact with one of the plurality of center blocks and a fourth groove turning portion among the groove turning portions of another of the plurality of center lug grooves in contact with the one of the plurality of center blocks;

the plurality of circumferential primary grooves and the circumferential secondary groove being inclined relative to the tire circumferential direction;

the plurality of circumferential primary grooves each including a section inclined toward a side in the tire width direction identical with the circumferential secondary groove;

an inclination angle $\theta_1$ of the section relative to the tire circumferential direction being different from an inclination angle $\theta_4$ of the circumferential secondary groove relative to the tire circumferential direction; and for a deepest groove depth $D_4$ of the circumferential secondary groove and a deepest groove depth $D_3$ of each of the plurality of center lug grooves, a ratio $D_4/D_3$ being from 0.20 to 0.50.

2. The heavy duty pneumatic tire according to claim 1, wherein on the first side, the third groove turning portion of each of the plurality center lug grooves is bent or curved protruding out toward a third side in the tire circumferential direction, and, on the second side, the fourth groove turning portion of each of the plurality of center lug grooves is bent or curved protruding out toward a fourth side opposite the third side in the tire circumferential direction, a first connection end of each of the plurality of center lug grooves on the first side and a second connection end of each of the plurality of center lug grooves on the second side, with which each of the plurality of center lug grooves is connected to the pair of circumferential primary grooves, are each connected to an end of the second groove turning portion on the inner side in the tire width direction, and the second connection end of each of the plurality of center lug grooves is located further to the third side in the tire circumferential direction than the first connection end, regarding a center position of each of the plurality of center lug grooves in a groove width direction, an inclination angle relative to the tire width direction of a first straight line that connects the first connection end and a protruding end of the third groove turning portion protruding out toward the third side in the tire circumferential direction, and an inclination angle relative to the tire width direction of a second straight line that connects the second connection end and a protruding end of the fourth groove turning portion protruding out toward the fourth side in the tire circumferential direction are larger than an inclination angle relative to the tire width direction of a third straight line that connects the first connection end and the second connection end of each of the plurality of center lug grooves.

3. The heavy duty pneumatic tire according to claim 2, wherein, regarding the center position of each of the plurality of center lug grooves in the groove width direction, a portion of each of the center lug grooves between the protruding end of the third groove turning portion protruding out toward the third side in the tire circumferential direction and the first connection end is on the first straight line or on the third side with respect to the first straight line, and a portion of each of the plurality of center lug grooves between the protruding end of the fourth groove turning portion protruding out toward the fourth side in the tire circumferential direction and the second connection end is on the second straight line or on the fourth side with respect to the second straight line.

4. The heavy duty pneumatic tire according to claim 1, wherein, for the inclination angle $\theta_4$ and the inclination angle $\theta_1$, $|\theta_1-\theta_4|$ is from 10 to 25 degrees.

5. The heavy duty pneumatic tire according to claim 1, wherein each of the pair of circumferential primary grooves is provided with a raised bottom portion at which the groove becomes partially shallower.

6. The heavy duty pneumatic tire according to claim 5, wherein, for a shallowest groove depth $D_2$ on the raised bottom portion and a tread width T of the tread portion in the tire width direction, a ratio $D_2/T$ is less than 0.05.

7. The heavy duty pneumatic tire according to claim 1, wherein the tread portion includes a tread rubber including a tread surface on which the tread pattern is formed, and
for a thickness $G_1$ of the tread rubber on the tire equator line and a thickness $G_2$ of the tread rubber at a position at which a groove depth of each of the pair of circumferential primary grooves is deepest, a ratio $G_1/G_2$ is from 4.0 to 7.0.

8. The heavy duty pneumatic tire according to claim 7, wherein the tread rubber includes a cap rubber forming a tread surface, and
a durometer hardness, compliant with JIS K6253, of the cap rubber is from 60 to 75.

9. The heavy duty pneumatic tire according to claim 1, wherein, for a groove width $P_4$ of the circumferential secondary groove and a groove width $P_1$ of each of the pair of circumferential primary grooves, a ratio $P_4/P_1$ is from 0.85 to 1.15.

10. The heavy duty pneumatic tire according to claim 1, the heavy duty pneumatic tire further comprising:
a belt portion including:
a pair of first cross belt layers, belt cords of which being inclined with respect to each other relative to the tire circumferential direction, and
a pair of second cross belt layers provided on an outer side in a tire radial direction of the pair of first cross belt layers, belt cords of which being inclined with respect to each other relative to the tire circumferential direction, wherein
the belt portion further includes a sheet-like rubber disposed between belt layers of the pair of second cross belt layers, and
for a maximum width $W_4$ of the sheet-like rubber in the tire width direction and a maximum width $W_B$ of the plurality of center blocks, a ratio $W_4/W_B$ is from 0.7 to 1.00.

11. The heavy duty pneumatic tire according to claim 10, wherein, for a belt width $W_5$ of an outermost belt layer of the belt portion and the maximum width $W_B$ of the plurality of center blocks, a ratio $W_B/W_5$ is from 0.50 to 0.90.

12. The heavy duty pneumatic tire according to claim 1, wherein each of the plurality of center blocks has a corner formed in correspondence with the first groove turning portion of each of the pair of circumferential primary grooves having a wave-like shape, the first groove turning portion protruding outward in the tire width direction; and the corner has an obtuse angle.

13. The heavy duty pneumatic tire according to claim 1, wherein a groove width of each of the pair of circumferential primary grooves and a groove width of the plurality of center lug grooves are from 7 to 20 mm.

14. The heavy duty pneumatic tire according to claim 1, the heavy duty pneumatic tire is mounted on one of a construction vehicle and an industrial vehicle.

15. The heavy duty pneumatic tire according to claim 1, wherein the tread portion includes a tread rubber including a tread surface on which the tread pattern is formed, and for a thickness $G_1$ of the tread rubber on the tire equator line and a thickness $G_2$ of the tread rubber at a position at which a groove depth of each of the pair of circumferential primary grooves is deepest, a ratio $G_1/G_2$ is from 4.0 to 5.5.

16. The heavy duty pneumatic tire according to claim 1, the heavy duty pneumatic tire further comprising:

a belt portion including:
a pair of first cross belt layers, belt cords of which being inclined with respect to each other relative to the tire circumferential direction, and
a pair of second cross belt layers provided on an outer side in a tire radial direction of the pair of first cross belt layers, belt cords of which being inclined with respect to each other relative to the tire circumferential direction, wherein
the belt portion further includes a sheet-like rubber disposed between belt layers of the pair of second cross belt layers, the sheet-like rubber having a width in the tire width direction less than widths in the tire width direction of the pair of the second cross belt layers, and
for a maximum width $W_4$ of the sheet-like rubber in the tire width direction and a maximum width $W_B$ of the plurality of center blocks, a ratio $W_4/W_B$ is from 0.7 to 1.00.

17. The heavy duty pneumatic tire according to claim 1, the heavy duty pneumatic tire further comprising a plurality of pairs of cross belt layers, wherein, for a belt width $W_5$ of an outermost belt layer of the plurality of pairs of cross belt layers and the maximum width $W_B$ of the plurality of center blocks, a ratio $W_B/W_5$ is from 0.50 to 0.90.

* * * * *